United States Patent [19]

Lanius et al.

[11] Patent Number: 4,930,591

[45] Date of Patent: Jun. 5, 1990

[54] GOLF CART OR THE LIKE

[75] Inventors: Charles Lanius, Prairie du Sac; Mark Gilbertson, Sauk City, both of Wis.

[73] Assignee: Columbia Parcar Corp., Deerfield, Wis.

[21] Appl. No.: 387,149

[22] Filed: Jul. 28, 1989

[51] Int. Cl.⁵ .............................................. B60K 1/00
[52] U.S. Cl. ............................ 180/65.1; 280/DIG. 5; 296/37.16
[58] Field of Search ................. 280/DIG. 5; 180/65.1, 180/65.5, 65.6, 65.7; 296/66, 65.1, 37.15, 37.16, 24.1, 102

[56] References Cited

U.S. PATENT DOCUMENTS 3,908,777 9/1975 Davidson ..................... 280/DIG. 5

FOREIGN PATENT DOCUMENTS 256013 3/1963 Australia ........................... 180/65.1

Primary Examiner—Charles A. Marmor
Assistant Examiner—Richard Camby
Attorney, Agent, or Firm—Allegretti & Witcoff, Ltd.

[57] ABSTRACT

A golf cart having an engine enclosure comprising a forward and a rearward clam shell, each pivotally connected to the cart chassis at their front and rear ends, respectively, to provide access to the engine compartment. The shells abut at their inner edges to provide a streamlined appearance. The forward shell is removable at the pivotal connection.

8 Claims, 2 Drawing Sheets

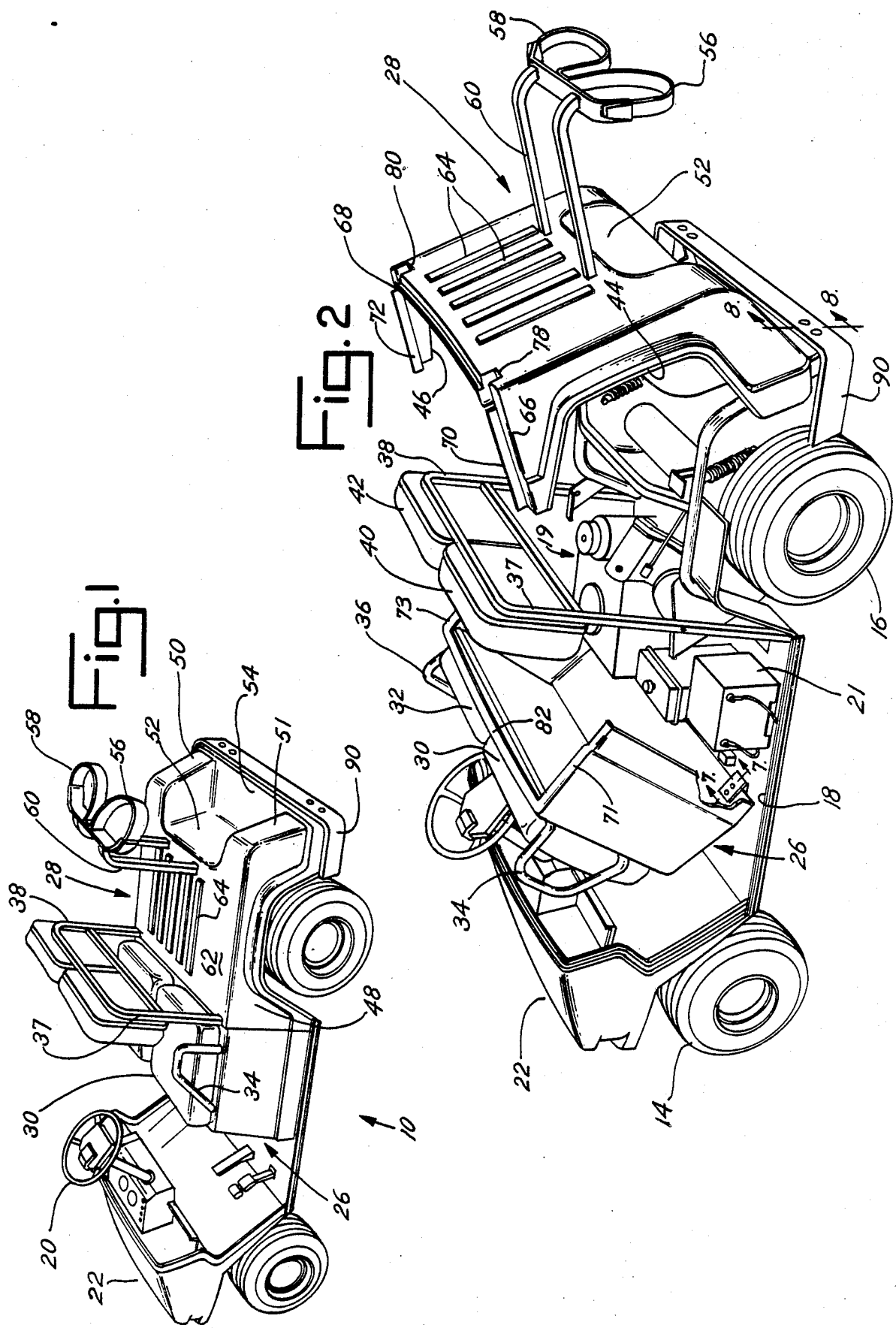

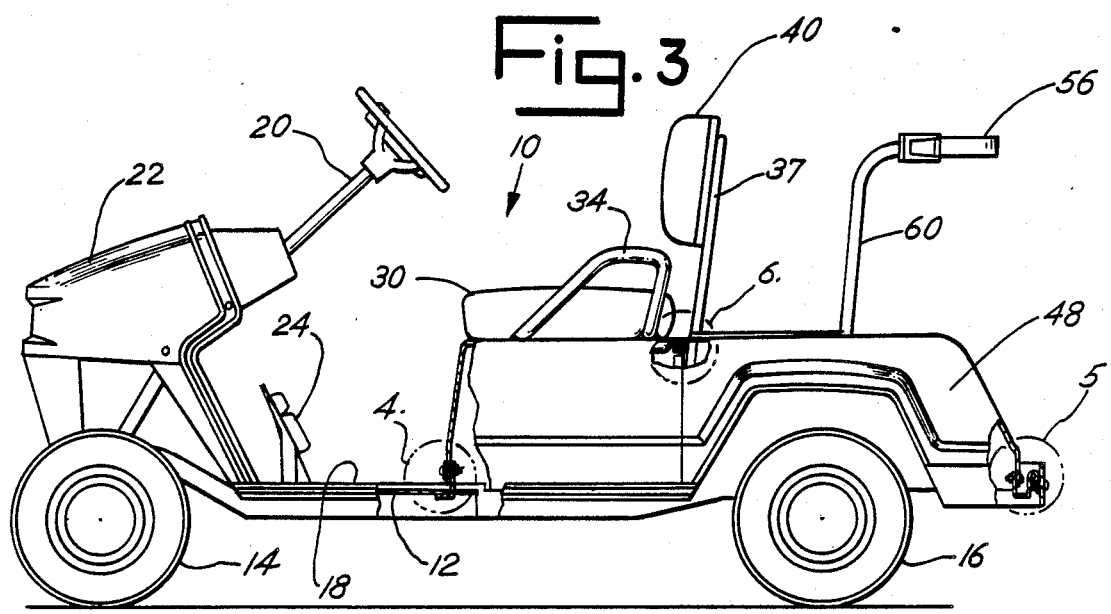
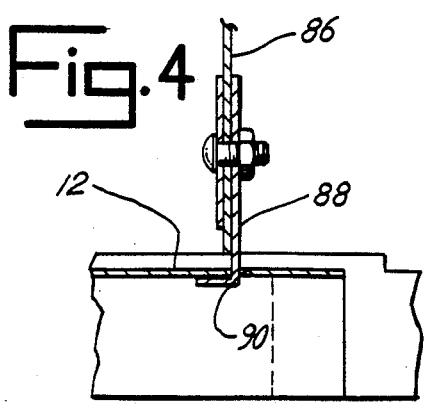
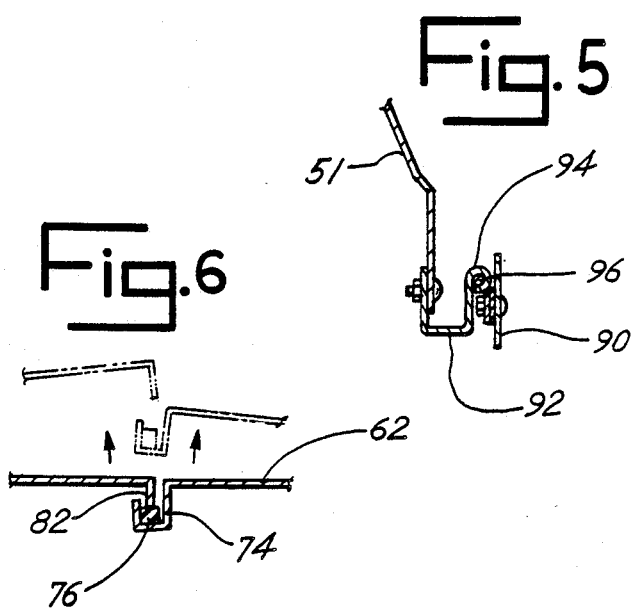
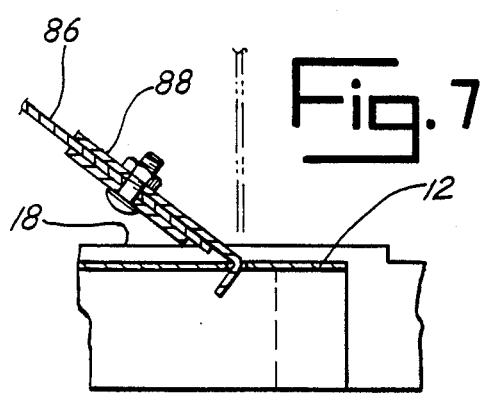
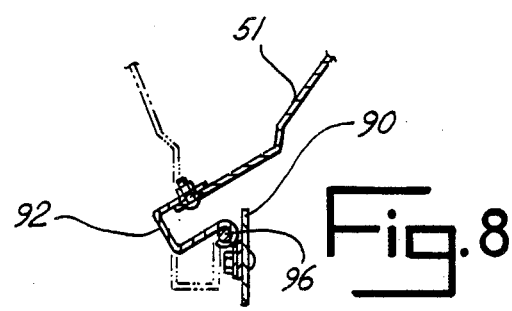

GOLF CART OR THE LIKE

BACKGROUND OF THE INVENTION

In prior art gasoline and electric carts, the engine compartments have been accessible only with great difficulty, much to the distress of the mechanics. Furthermore, in gasoline and electric carts, the battery terminals were exposed to facilitate charging. In such carts, it was possible for the driver to get in and drive away while the charger was still connected.

The objects of the invention are to provide a two-piece body structure which opens to permit accessibility to the engine compartment for repetitive general maintenance and major repairs, and which closes to give the appearance of a unitary smooth-surfaced streamlined enclosure. Another object is to provide such a structure, at least one piece of which is completely removable from the chassis of the cart, said removable piece carrying the passenger seats. Another object is to provide a cart of the type described which has a pair of upright support frame members which are enclosed by the complementary pieces of the body structure when in closed position. Another object is to make the battery accessible for charging only when the seats are positioned to prevent a passenger from sitting on them.

SUMMARY OF THE INVENTION

These objects are accomplished by providing a forward and rearward clam shell, each of which is pivotally connected to the frame or chassis of the cart. The forward shell is pivoted at its forward end and the rearward shell is pivoted at its rear end. The shells abut at their inner edges to provide a smooth surfaced enclosure for the engine together with a drip well for discharging water. The forward shell carries the passenger seat cushions and a pair of arm rests, one on either side of the cart, the lower ends of which are disposed beneath the cushions whereby the weight of the passenger on the seat assists in securing said arm rests to said claim shell. The forward clam shell has pivots connecting to the frame of the cart which are removable therefrom to provide full access to the engine compartment for removing the batteries and the like. The clam shells, when pivoted down in closed position, surround the upright frame members which support the back rests for the seats. The rear clam shell has a well and a complementary rack for golf bags.

IN THE DRAWINGS

The structure of the invention will be described in more detail in connection with the accompanying drawings in which FIG. 1 is a perspective view of a golf cart of the invention showing the clam shell enclosure in closed position.

FIG. 2 is a view similar to FIG. 1 in which the clam shells are in open position to expose the engine and other mechanical parts of the cart.

FIG. 3 is a side elevational view of the cart of the invention showing in section details of the pivots for the front and rear shells.

FIG. 4 is an enlarged side sectional view of one front pivot taken from circle 4 of FIG. 3.

FIG. 5 is an enlarged side sectional view of one rear pivot taken from circle 5 of FIG. 3.

FIG. 6 is a detailed sectional view of the juncture, taken from circle 6 of FIG. 3, where the forward and rearward clam shells join. The parts separate as shown in broken lines when the shells move in the direction indicated by the arrows.

FIG. 7 is a sectional view taken along the line 7—7 of FIG. 2.

FIG. 8 is a view of the pivot of FIG. 5 showing the position of the pivot when the rearward clam shell is in open position, taken along the line 8—8 of FIG. 2.

Referring specifically to FIGS. 1 and 2, the cart is designated generally by the numeral 10 and has a chassis 12 supported by a pair of front wheels 14 and a pair of rear wheels 16. A floorboard 18 is supported by the frame of the vehicle. Mounted over the rear wheels 18 is the engine 19 and ancillary parts including a battery 21. A conventional steering wheel is provided for turning the front wheels 14. A cowl 22 is positioned forwardly of the steering wheel. Operating pedals 24 are mounted on the floorboard 18.

The engine is enclosed in a forward clam shell 26 pivoted as described below. A complementary rear clam shell 28 pivoted at its rear end joins with the forward clam shell 26 in closed position shown in FIG. 1 to provide a smooth-surfaced streamlined enclosure. Mounted on the top of the forward shell 26 are a pair of passenger seats 30, 32 and a pair of vertical arm rests 34, 36 having lower horizontal portions disposed beneath the seats 30, 32. Rising from the chassis of the cart are upright tubular frame members 37, 38 which support at their upper ends the backrests 40, 42.

The rear shell 28 has a pair of cut-out portions 44, 46 in the side walls 48, 50 to accommodate the rear wheels 16. A well or depression 52 is molded in the rear wall of the shell 28 which has a floor member 54. A bracket 60 secured at its lower end to the deck 62 terminates at its upper end in circular clamps 56, 58 for securing golf bags placed in the well 52. A series of parallel depressions 64 are provided in the deck for imparting rigidity thereto. The sidewalls 48, 50 of the rear shell 28 terminate at their inner edges 66, 68 in right angle flanges 70, 72 which cooperate with the inner edge of the forward clam shell 26 as described below.

As shown in FIGS. 2 and 6, the deck 62 stretching between the sidewalls 48, 50 terminates in a U-shaped lip 74 which serves as a drip well as well as a seal for the joint between the rear and forward clam shells. A gasket 76 is provided in the well to form a seal with a cooperating flange 82 on the inner edge of the forward shell 26. The position of these cooperating parts is shown in broken lines when the parts are pivoted in the direction of the arrows shown in FIG. 6. Water on the deck 62 can flow down between the abutting edges into the well 74 by gravity and laterally to the opposed sides of the shell 28. Cutouts 78, 80 in the deck 62 accommodate the uprights 37, 38 when the shell 28 is in closed position. When the shells are in closed position the flanges 70, 72 fit inside the side wall flanges 71, 73 of shell 26.

The front wall 86 of the clam shell 26 has a pair of brackets at its lower edge, one of which is shown in FIG. 3. Only one of the pair will be described. As best shown in FIG. 4 the front wall 86 of shell 26 is sandwiched between a washer and the angle bracket 88, the lower end of which is disposed in an opening 90 in the surface of the frame 12 beneath the floor 18. This pivot structure permits the clam shell 26 to be tilted forward about the lower edge of front wall 86 and, if desired, to be removed from the opening 90 in the floorboard as shown in FIG. 7. The clam shell is removed completely only when it is necessary to get into the engine compartment for major repairs. Access to the battery 21 is provided merely by tilting the shell forward as shown in FIG. 2.

The rear clam shell 28 is pivoted about the rear bumper 90 in the manner best shown in FIG. 5. The portions 51, 50 of the rear wall of the clam shell 28 on either side of the well 52 have U-shaped brackets 92 bolted to the lower edges thereof. Each of the brackets 92 terminates at the upper end in a bearing 94 which pivots around pin 96 secured to the bumper 90.

The engine compartment is readily accessible by tilting the shells about their respective pivots as shown in FIG. 2. It will be noted that the battery 21 is mounted on the chassis under the front clam shell 26. It is accessible only when the shell is tilted in the position shown in FIG. 2. Since the passenger seats 30, 32 tilt with the shell, it is not possible for a passenger to get into the vehicle and operate it at the same time that the battery is accessible. Consequently, this makes charging safer and eliminates the possibility of the cart being driven while the charger is still connected.

The structure described makes the engine compartment available with little effort. If full access is required, the front clam shell can be completely removed.

The clam shells are preferably constructed from plastic material such as glass fabric impregnated with polyester resin.

What is claimed is:

1. In a golf cart having a frame, a pair of front and rear wheels supporting said frame, an engine and battery mounted on said frame forwardly of said rear wheels in an engine compartment, the improvement comprising a first clam shell enclosing the forward portion of said engine compartment,
      said first clam shell being pivotally mounted on said frame forwardly of said compartment,
   a pair of seats secured to the upper surface of said first clam shell enclosure,
   a second clam shell complementing said first clam shell to enclose completely said engine compartment,
      said second clam shell being pivotally mounted on said frame rearwardly of said engine compartment behind said rear wheels,
   said first and second clam shells having cooperating inner edges which abut when said clam shells are in closed position to provide a smooth continuous shell enclosure for said engine compartment.

2. The golf cart of claim 1 which includes a floorboard on said frame forwardly of said first clam shell and in which said pivots for said first clam shell are removably secured to said floorboard.

3. The golf cart of claim 1 in which said clam shells are molded from plastic reinforced with glass cloth.

4. The golf cart of claim 1 which includes a fixed back support extending upwardly from said frame including a pair of upright members secured to said frame, said upright members being disposed on a line coincident with said abutting inner edges and enclosed by cut-outs in said edges.

5. The golf cart of claim 1 which includes a carrier rack secured to said rear clam shell.

6. The golf cart of claim 1 which includes a drip well in the surface of said clam shells overlying said abutting inner edges.

7. The golf cart of claim 1 which includes a pair of arm rests, one on either side of said cart, said arm rests being connected to the upper surface of said first clam shell beneath said seats, whereby the weight of a passenger on said seats assists in securing said arm rests to said clam shell.

8. The golf cart of claim 3 in which a battery is enclosed in said engine compartment and is not accessible until the first clam shell including the seats are tilted forward.

* * * * *